United States Patent
Graham et al.

(10) Patent No.: US 9,400,704 B2
(45) Date of Patent: Jul. 26, 2016

(54) IMPLEMENTING DISTRIBUTED DEBUG DATA COLLECTION AND ANALYSIS FOR A SHARED ADAPTER IN A VIRTUALIZED SYSTEM

(71) Applicant: GLOBALFOUNDRIES Inc., Grand Cayman (KY)

(72) Inventors: Charles S. Graham, Rochester, MN (US); Robert J. Manulik, Rochester, MN (US); John R. Oberly, III, Rochester, MN (US); Timothy J. Schimke, Stewartville, MN (US)

(73) Assignee: Globalfoundries Inc., Grand Cayman (KY)

( * ) Notice: Subject to any disclaimer, the term of this patent is extended or adjusted under 35 U.S.C. 154(b) by 358 days.

(21) Appl. No.: 13/915,887

(22) Filed: Jun. 12, 2013

(65) Prior Publication Data

US 2014/0372795 A1    Dec. 18, 2014

(51) Int. Cl.
*G06F 11/07*    (2006.01)
(52) U.S. Cl.
CPC ........ *G06F 11/0712* (2013.01); *G06F 11/0778* (2013.01); *G06F 11/0793* (2013.01)
(58) Field of Classification Search
CPC   G06F 11/0712; G06F 11/778; G06F 11/0778
See application file for complete search history.

(56) References Cited

U.S. PATENT DOCUMENTS

| | | | |
|---|---|---|---|
| 5,875,310 A | 2/1999 | Buckland et al. | |
| 6,122,289 A | 9/2000 | Brown et al. | |
| 6,311,326 B1 | 10/2001 | Shagam | |
| 7,231,493 B2 | 6/2007 | Nguyen et al. | |
| 7,757,129 B2 | 7/2010 | Bohizic et al. | |
| 7,770,073 B2 | 8/2010 | Fashchik et al. | |
| 8,141,092 B2 | 3/2012 | Brown et al. | |
| 8,261,242 B2 | 9/2012 | Booth et al. | |
| 8,358,661 B2 | 1/2013 | Armstrong et al. | |
| 8,359,415 B2 | 1/2013 | Brown et al. | |
| 8,375,363 B2 | 2/2013 | Zhou et al. | |
| 8,418,166 B2 | 4/2013 | Armstrong et al. | |

(Continued)

FOREIGN PATENT DOCUMENTS

EP    1130501 A1    9/2001

OTHER PUBLICATIONS

PCI-SIG, Single Root I/O Virtualization and Sharing Specification, Jan. 20, 2010, Revision 1.1.*

(Continued)

*Primary Examiner* — Albert Decady
*Assistant Examiner* — Paul Contino
(74) *Attorney, Agent, or Firm* — Heslin Rothenberg Farley & Mesiti P.C.

(57) ABSTRACT

A method, system and computer program product are provided for implementing distributed debug data collection and analysis for a hardware I/O adapter, such as, a Single Root Input/Output Virtualization (SRIOV) adapter in a virtualized system. A predetermined event triggers a base error collection sequence. Adapter driver data is collected and virtual function (VF) device drivers are locked out responsive to triggering the base error collection sequence. Adapter debug data is collected and the adapter is reinitialized including an indication to VF drivers if VF error data is to be collected. The virtual function (VF) device drivers are unlocked allowing the VF device drivers to commence recovery of a respective virtual function (VF).

20 Claims, 5 Drawing Sheets

(56) References Cited

U.S. PATENT DOCUMENTS

| | | | |
|---|---|---|---|
| 8,447,891 B2 | 5/2013 | Brownlow et al. | |
| 9,304,849 B2 | 4/2016 | Arroyo | |
| 9,317,317 B2 | 4/2016 | Graham | |
| 9,323,620 B2 | 4/2016 | Graham | |
| 2002/0161907 A1 | 10/2002 | Moon | |
| 2003/0037275 A1 | 2/2003 | Bakke et al. | |
| 2004/0049710 A1* | 3/2004 | Ashmore et al. | 714/5 |
| 2005/0172305 A1* | 8/2005 | Baumberger | 719/327 |
| 2008/0126780 A1* | 5/2008 | Rajkumari et al. | 713/2 |
| 2008/0147904 A1 | 6/2008 | Freimuth et al. | |
| 2009/0133028 A1* | 5/2009 | Brown et al. | 718/104 |
| 2010/0115049 A1 | 5/2010 | Matsunaga et al. | |
| 2011/0040860 A1 | 2/2011 | DeCusatis et al. | |
| 2011/0231710 A1* | 9/2011 | Laor | 714/38.11 |
| 2011/0246986 A1* | 10/2011 | Nicholas et al. | 718/1 |
| 2012/0102491 A1* | 4/2012 | Maharana | 718/1 |
| 2012/0137288 A1 | 5/2012 | Barrett et al. | |
| 2012/0151472 A1 | 6/2012 | Koch et al. | |
| 2012/0179932 A1 | 7/2012 | Armstrong et al. | |
| 2012/0180047 A1 | 7/2012 | Cardona et al. | |
| 2012/0180048 A1* | 7/2012 | Brownlow et al. | 718/1 |
| 2012/0185632 A1 | 7/2012 | Lais et al. | |
| 2012/0198446 A1* | 8/2012 | Sawa | G06F 9/45558 718/1 |
| 2012/0246644 A1* | 9/2012 | Hattori et al. | 718/1 |
| 2012/0297379 A1 | 11/2012 | Anderson et al. | |
| 2012/0317548 A1 | 12/2012 | Olsa et al. | |
| 2013/0054507 A1 | 2/2013 | Das et al. | |
| 2013/0151908 A1* | 6/2013 | Iwanaga et al. | 714/48 |
| 2013/0159764 A1* | 6/2013 | Adar et al. | 714/5.1 |
| 2013/0275972 A1* | 10/2013 | Sawa et al. | 718/1 |
| 2014/0250338 A1* | 9/2014 | Prabhakaran et al. | 714/56 |
| 2015/0127971 A1* | 5/2015 | Arroyo | G06F 11/2097 714/5.11 |

OTHER PUBLICATIONS

Bhosale, Shivaji D. et al., "IBM Power Systems SR-IOV Technical Overview and Introduction", REDP-5065-00, International Business Machines Corporation, May 20, 2014, pp. 1-71.

Ko, Mike et al., "Virtual Ethernet Bridging", International Business Machines Corporation, Jul. 2008, pp. 1-11.

Power 7 Information, Virtualizing Power Systems Servers, International Business Machines Corporation, Apr. 29, 2014.

Emulex, "Single Root I/O Virtualization (SR-IOV)", Version 3.1 User's Guide, P007978-01A Rev. A, 2012, pp. 1-5.

Varma, Anujan, "Single Root IOV Endpoint Implementation", PCI-SIG Developers Conference 2007, PCI-SIG, May 21, 2007, pp. 1-36.

International Search Report and Written Opinion of the ISA dated Jul. 8, 2014—International Application No. PCT/JP2014/002914.

Netronome; "Standardized but Flexible I/O for Self-Virtualizing Devices"; WTOV'08 Proceedings of the First Conference on I/O Virtualization; p. 9-9; 2008.

Broadcom; "Broadcom Ethernet Network Controller Enhanced Virtualization Functionality"; http://www.broadcom.com/press/release.php?id=1197764; White Paper; Oct. 2009.

Challa, NR.; "Hardware Based I/O Virtualization Technologies for Hypervisors, Configurations, and Advantages—A Study"; Proceedings of the 2012 IEEE International Conference on Cloud Computing in Emerging Markets (CCEM), 5 pp.; IEEE; 2012.

Kirk Glerum et al., "Debugging in the (Very) Large: Ten Years of Implementation and Experience", Microsoft Corporation, 2009.

Nithya Ramanathan et al., "Sympathy for the Sensor Network Debugger", UCLA Center for Embedded Network Sensing, 2005.

\* cited by examiner

IMPLEMENTING DISTRIBUTED DEBUG DATA COLLECTION AND ANALYSIS FOR A SHARED ADAPTER IN A VIRTUALIZED SYSTEM

FIELD OF THE INVENTION

The present invention relates generally to the data processing field, and more particularly, relates to a method, system and computer program product for implementing distributed debug data collection and analysis for a hardware I/O adapter, such as, a Single Root Input/Output Virtualization (SRIOV) adapter in a virtualized system.

DESCRIPTION OF THE RELATED ART

Single root input/output (IO) virtualization (SRIOV) is a PCI standard, providing an adapter technology building block for I/O virtualization within the PCI-Express (PCIe) industry. SRIOV capability is a feature of many new PCIe adapters for Fibre Channel, Ethernet, Infiniband, and Converged Network Adapters (CNA).

The SRIOV adapter has an I/O adapter virtualization architecture that allows a single I/O adapter to be concurrently shared across many different logical partitions. The sharing is done at a physical level, so that each logical partition has access to a slice of the physical adapter. The sharing is accomplished via partitioning the adapter into many different PCI functions, and then distributing access to those functions. The adapter is presented as one or more physical functions (PFs) that control functions, for example used for both configuration and I/O, and a set of virtual functions (VFs), used for I/O and limited configuration, each VF represents a slice of the adapter capacity that can be assigned to a logical partition independently of other VFs. Each logical partition has a device driver for each of the VFs assigned to the logical partition.

With the SRIOV adapter a new problem arises when an error is encountered. The desire is to collect error data when an interesting problem arises, and to capture all error data on the first occurrence of an error, or first failure data capture (FFDC), such that problem recreates are not required. This error data can include items such as an adapter dump, device driver state, PCI function state, system state, and the like. For a shared SRIOV adapter, there are multiple device drivers concurrently running in multiple partitions all talking to the same adapter. Additionally, the error data may be privileged, such that there may be security reasons why a given VF should not have access to the error data for other VFs.

Additionally, error data must be captured judiciously as it is expensive in both size required to save the error data, and the length of time to collect the information. Collecting error data in the absence of an important error is undesired because of this cost. For example, it can lengthen the recovery time and result in an increased period of time where I/O is unavailable causing potential customer impact.

Further, the debug data to be collected is distributed across the system. Relevant data to be captured may reside in the adapter, in a system hypervisor, and in operating system partitions. Additionally, the entity that detected the error may not have access to all of the error data across the system that is relevant to the problem at hand. There is no direct communication channel between the partitions and the hypervisor that can be used to communicate and coordinate the process.

A need exists for an effective mechanism to enable distributed debug data collection and analysis for a hardware I/O adapter or a Single Root Input/Output Virtualization (SRIOV) adapter in a virtualized system. It is desirable that such mechanism enables effective and efficient data collection and analysis operations.

SUMMARY OF THE INVENTION

Principal aspects of the present invention are to provide a method, system and computer program product for implementing distributed debug data collection and analysis for a hardware I/O adapter, such as a Single Root Input/Output Virtualization (SRIOV) adapter, in a virtualized system. Other important aspects of the present invention are to provide such method, system and computer program product substantially without negative effects and that overcome many of the disadvantages of prior art arrangements.

In brief, a method, system and computer program product are provided for implementing distributed debug data collection and analysis for a hardware I/O adapter, such as a Single Root Input/Output Virtualization (SRIOV) adapter, in a virtualized system. A predetermined event triggers a base error collection sequence. Adapter driver data is collected and virtual function (VF) device drivers are locked out responsive to triggering the base error collection sequence. Adapter debug data is collected and the adapter is reinitialized including an indication to VF device drivers if VF error data is to be collected. The virtual function (VF) device drivers are unlocked allowing the VF device drivers to commence recovery of a respective virtual function (VF).

In accordance with features of the invention, a system hypervisor manages data collection from the adapter, and additionally provides the novel in-band indication to the VF device drivers as to whether error data is to be collected and saved.

In accordance with features of the invention, the predetermined event triggering the base error collection sequence includes an adapter driver provided with a system hypervisor detecting one of an internal adapter driver error, a platform error, an adapter error, and an adapter dump present on the adapter.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing distributed debug data collection and analysis for a hardware I/O adapter, such as a Single Root Input/Output Virtualization (SRIOV) adapter, in a virtualized system.

Figure 1:
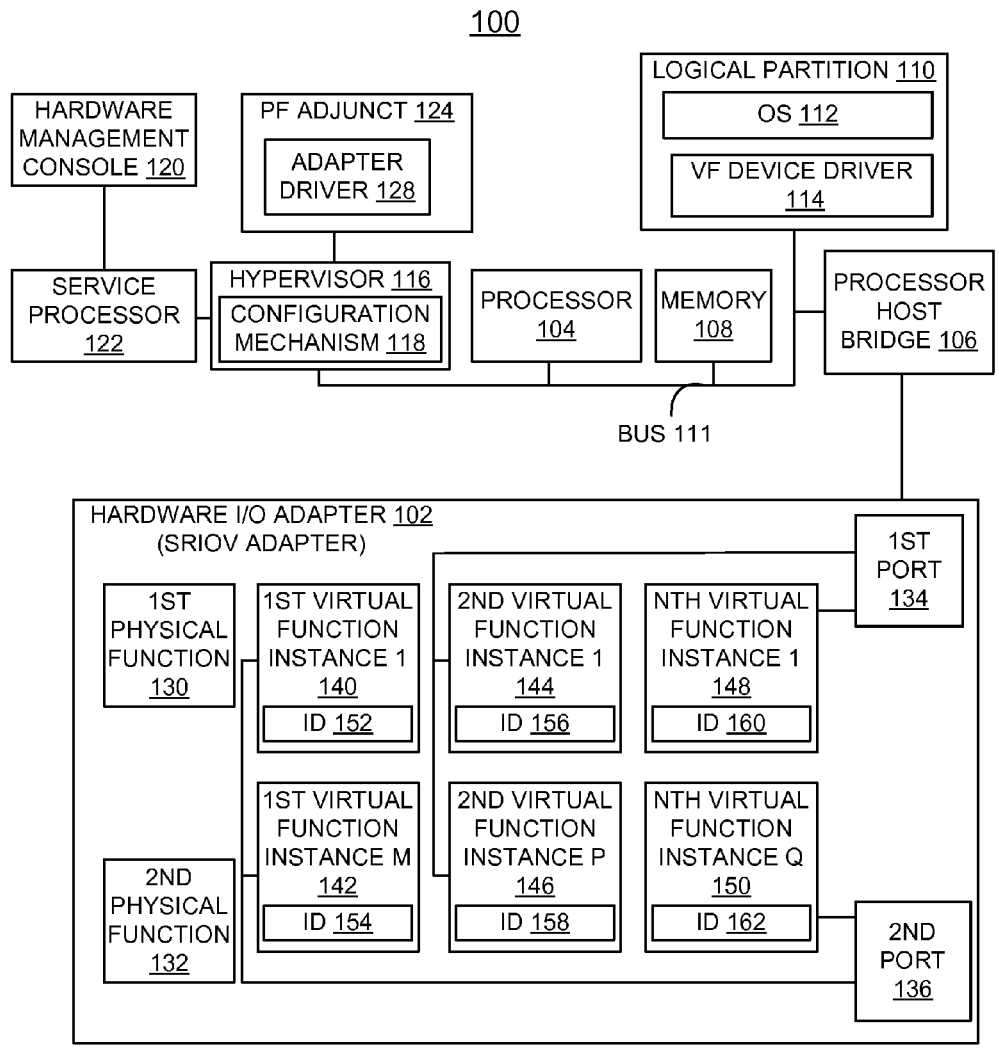
FIGS. 1, and 2 illustrates a respective example computer system and example system for implementing distributed debug data collection and analysis for a hardware I/O adapter, such as, a Single Root Input/Output Virtualization (SRIOV) adapter in accordance with the preferred embodiment.

Having reference now to the drawings, in FIG. 1, there is shown an example computer system generally designated by the reference character 100 for implementing distributed debug data collection and analysis for a hardware I/O adapter or Single Root Input/Output Virtualization (SRIOV) adapter 102 in accordance with the preferred embodiment. Computer system 100 includes one or more processors 104, or central processor units (CPUs) 104 (one shown) coupled by an I/O hub or processor host bridge 106 to the Single Root Input/Output Virtualization (SRIOV) adapter or hardware I/O adapter 102.

Computer system 100 includes a memory 108 and one or more logical partitions (LPARs) 110 (one shown) coupled by a system bus 111 to the processor 104 and the processor host bridge 106. Each operating system (OS) 112 resides in its own LPAR 110, with each LPAR allocated a part of a physical processor 104, an entire physical processor, or multiple physical processors from the computer 100. A VF device driver 114 is provided with the logical partition (LPAR) 110. A portion of the memory 108 is allocated to each LPAR 110. Computer system 100 includes a hypervisor 116 including a configuration mechanism 118. The hypervisor 116 is a part of the system firmware and manages the allocation of resources to each operating system 112 and LPAR 110.

As shown, a hardware management console (HMC) 120 used, for example, to manage system functions including logical partition configuration and hardware virtualization, is coupled to the hypervisor 116 via a service processor 122. Computer system 100 includes a physical function (PF) manager or PF adjunct 124 provided with the hypervisor 116. The PF adjunct 124 includes an adapter driver 128 to manage physical functions of the hardware I/O adapter 102. The hypervisor 116 uses the PF adjunct 124, for example, to configure physical functions (PFs) and virtual functions (VFs) of the hardware I/O adapter 102 based on configuration information provided by a system administrator via the hardware management console 120.

As shown, the hardware I/O adapter 102 includes, for example, a first physical function 130, a second physical function 132, a first port 134, and a second port 136. The hypervisor 116 using the PF adjunct 124 configures virtual functions based on the physical functions 130, 132 and associates virtual functions with one or more of the ports 134, 136 of the hardware I/O adapter 102.

For example, a first virtual function, 140, instance 1, and the Mth instance of the first virtual function 142, where M is greater than 1, are associated with the second port 136. As shown, a second virtual function 144, such as the first instance of the second virtual function 144 and the Pth instance of the second virtual function 146, where P is greater than 1, are associated with the first port 134. As shown, multiple instances of an Nth virtual function, where N is greater than 2, such as the first instance of the Nth virtual function 148 is associated with the first port 134 and the Qth instance of the Nth virtual function 150, where Q is greater than 1, is associated with the second port 136.

Each instance of the first virtual function 140, 142, the second virtual function 144, 146, and Nth virtual function 148, 150 are hosted by a physical function, such as one of the first physical function 132, the second physical function 132, and another physical function (not shown).

Each instance of the first virtual function 140, 142, the second virtual function 144, 146, and Nth virtual function 148, 150 includes a respective virtual function identifier (ID), shown as ID 152, ID 154, ID 156, ID 158, ID 160, and ID 162. Each virtual function identifier uniquely identifies a particular virtual function that is hosted by the hardware I/O adapter 102. For example, when a message (not shown) is routed to a particular virtual function, the message includes the identifier associated with the particular virtual function.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 2:
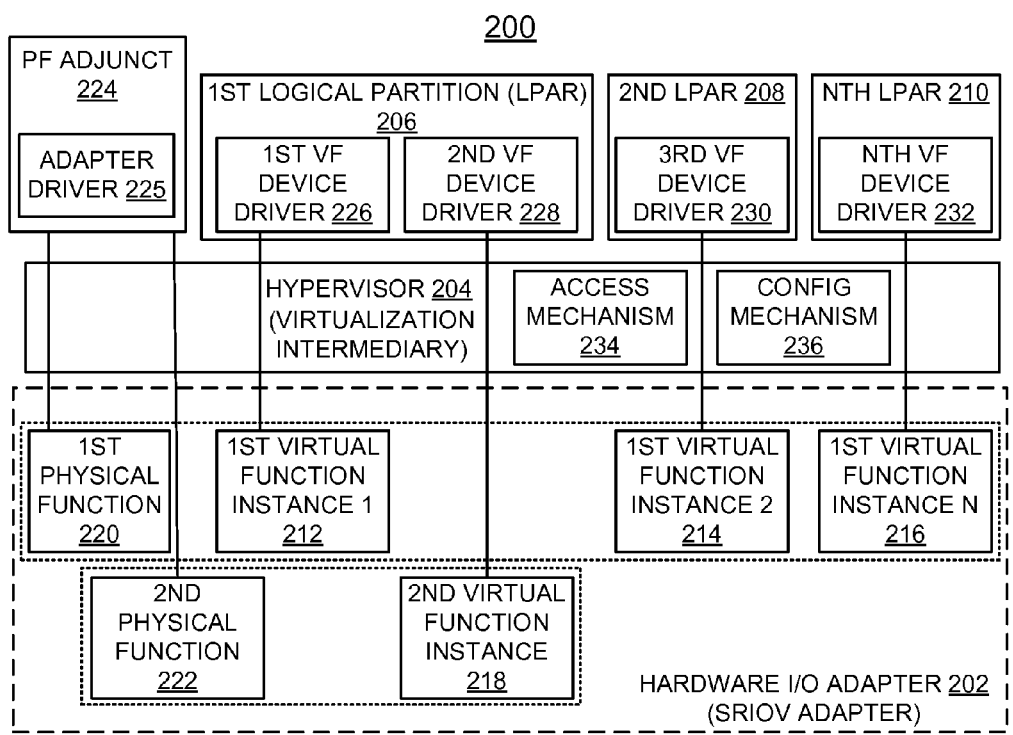

Referring to FIG. 2, there is shown another example system generally designated by the reference character 200 for implementing distributed debug data collection and analysis for a hardware I/O adapter or Single Root Input/Output Virtualization (SRIOV) adapter 202 in accordance with the preferred embodiment.

System 200 includes a hypervisor 204 or other virtualization intermediary, used to enable multiple logical partitions to access virtual functions provided by hardware that includes the hardware I/O adapter 202. For example, as shown in FIG. 2, the hypervisor 204 is used to enable a first logical partition 206, a second logical partition 208, and an Nth logical partition 210, to access a plurality of virtual functions 212, 214, 216, 218 that are provided by the hardware I/O adapter 202. For example, the hypervisor 204 used a first physical function 220 of the hardware I/O adapter 202 to provide a first instance of a first virtual function 212, a second instance of a first virtual function 214, and an Nth instance of a first virtual function 216 to the logical partitions 204, 206, 210. As shown the hypervisor 204 uses a second physical function 222 of the hardware I/O adapter 202 to provide a second virtual function 218 to the logical partitions 206, 208, 210.

The physical functions 220, 222 advantageously include PCI functions, supporting single root I/O virtualization capabilities. Each of the virtual functions 212, 214, 216, 218 is associated with one of the physical functions 220, 222 and adapted to share one or more physical resources of the hardware I/O adapter 202.

Software functions or modules, such as a physical function (PF) adjunct 224 including an adapter driver 225, is provided with the hypervisor 204 for managing the physical functions 220, 222 and the virtual functions 212, 214, 216, 218. For example, a user may specify a particular configuration and the hypervisor 204 uses the PF adjunct 224 to configure the virtual functions 212, 214, 216, 218 from the physical functions 220, 222.

For example, in operation, the hypervisor 204 with the PF adjunct 224 enables the first virtual function instances 212, 214, 216 from the first physical function 220. The hypervisor 204 with the PF adjunct 224 enables the second virtual function 218 from the second physical function 222. The virtual functions 212, 214, 216, 218 are enabled, for example, based on a user provided configuration. Each of the logical partitions 206, 208, 210 may execute an operating system (not shown) and client applications (not shown).

As shown, the client applications that execute at the logical partitions 206, 208, 210 perform virtual input/output operations and include a respective device driver to directly manage an associated virtual function. For example, a first client application executing at the first logical partition 206 may include a first client VF device driver 226, and a second client application executing at the first logical partition 206 may include a second client VF device driver 228.

As shown, the first client VF device driver 226 accesses the first instance of the first virtual function 212. The second client virtual VF device driver 228 accesses the second virtual function 218. A third client VF device driver 230 executing at the second logical partition 208 accesses the second instance of the first virtual function 214. An Nth client VF device driver 232 executing at the Nth logical partition 210 accesses the Nth instance of the first virtual function 216. An access mechanism 234 and a configuration mechanism 236 are provided with the hypervisor 204 to associate a logical partition with an accessed virtual function. The hypervisor 304 uses the access mechanism 234 to enable logical partitions, such as LPAR 206 to access configuration space associated with one or more of the virtual functions 212, 214, 216, 218.

System 200 is shown in simplified form sufficient for understanding the present invention. The illustrated system 200 is not intended to imply architectural or functional limitations. The present invention can be used with various hardware implementations and systems and various other internal hardware devices.

In accordance with features of the invention, debug data to be collected may reside in the adapter, in the hypervisor, and in the operating system partitions. The hypervisor manages the data collection from the adapter, and provides a novel in-band indication to the partitions as to whether error data is to be collected and saved.

In accordance with features of the invention, a system administrator can temporarily give a partition (managing a VF) the ability to initiate error data collection, a privilege which it would not ordinarily have. Advantages of the invention are: Error data is collected only when necessary. Error data is collected across all partitions, as well as the hypervisor and the adapter. No communication is necessary between the hypervisor and the partitions. Existing function-scope data collection is unaffected. That is, a VF driver can collect data for its function without impacting other functions.

In accordance with features of the invention, a base sequence of actions is taken each time error data collection is invoked. The primary driver of the sequence is the adapter driver, which is resident in the hypervisor. This sequence can be triggered by a predetermined event including several stimuli, such as, a specific request from the HMC (hardware management console), adapter driver detected adapter error, such as a command failure, an internal adapter driver software error, an indication of a platform-detected error, and a detection of an adapter dump present on the adapter, where the adapter can decide to self-dump on internally detected errors.

Figure 3:
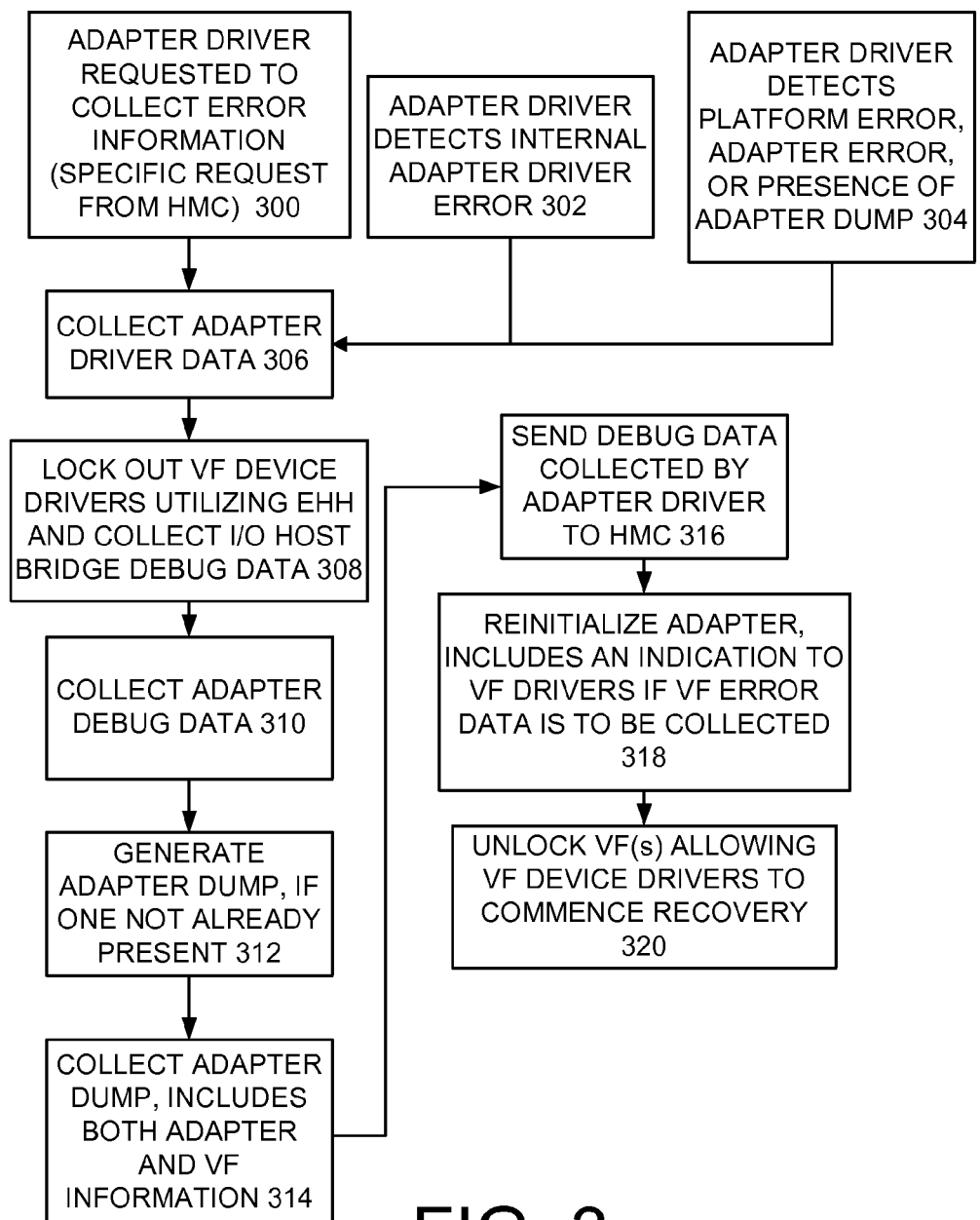
FIGS. 3, and 4 together provide a flow chart illustrating exemplary operations for implementing distributed debug data collection and analysis for the SRIOV adapter in accordance with the preferred embodiment.
Figure 4:
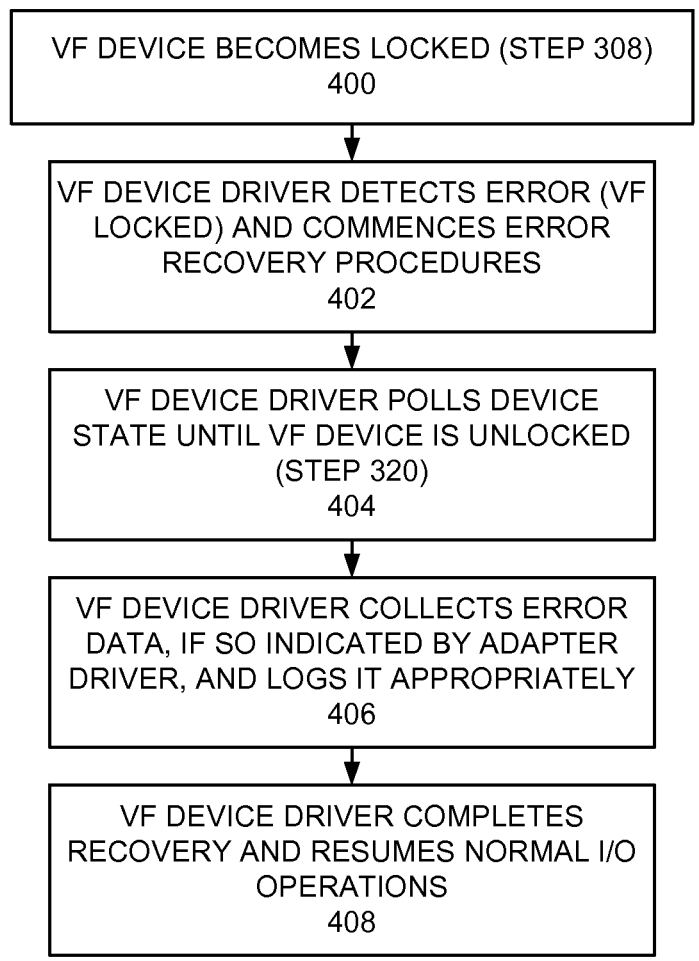

Referring to FIGS. 3 and 4, there are shown exemplary operations of the processing and logic provided by the hypervisor 130 for implementing distributed debug data collection and analysis for a hardware I/O adapter in accordance with the preferred embodiment.

In FIG. 3, as indicated in a block 300, the adapter driver is request to collect error information, for example, a specific request is provided from the hardware management console (HMC) 120. As indicated in a block 302, the adapter driver detects an internal adapter driver error, such as an internal adapter driver software error. As indicated in a block 304, the adapter driver detects a platform error, an adapter error, such as a command failure, or an adapter dump present on the adapter, where for example, the adapter can decide to self-dump on internally detected errors. The base error collection sequence is triggered responsive to such predetermined triggering event at block 300, 302, or 304.

The base error collection sequence optionally can be initiated by a VF device driver in accordance with a preferred embodiment. Ordinarily a VF device driver does not have the privilege to initiate the data collection process. The key reason is that this is a disruptive process, resulting in temporary I/O disruptions as the process completes. A misbehaving device driver can cause significant system impacts.

In accordance with features of the invention, a VF device driver is enabled to initiate the data collection process and there are important cases where this may be required. One example is to trigger an adapter dump immediately upon some VF-detected condition. This could be necessary since delaying the adapter dump might result in important information being lost due to delays in initiating the recovery. To accommodate the VF device driver being enabled to initiate the data collection process, a new adapter capability has been specified and implemented. This capability is a settable privilege or dump initiation for a given VF. When a VF has been given this privilege, a VF device driver can request the adapter initiate an adapter dump. The VF device driver still cannot collect the dump, for security reasons. This privilege can be dynamically added/removed concurrent with normal VF operations.

For example, a system administrator uses the HMC to give a VF dump privilege, and the HMC communicates this to the adapter driver, for example, at block 300. The adapter driver communicates with the physical adapter to update the VF privileges. Also, for example, when the VF device driver detects a problem for which it would like to generate an adapter dump, the VF device driver queries the adapter to determine if it has the required privilege level. Alternatively, the VF device driver can blindly attempt and fail if not authorized. Also, for example, the VF device driver requests the adapter generate an adapter dump. This dump is presumably close in time to some important event detected by the VF device driver, and the adapter dumps itself. The adapter driver detects, for example, via background health poll the existence of the adapter dump, such as at block 304, which initiates the data collection sequence The VF dump privilege is revoked by the system administrator using the HMC. The HMC notifies the adapter driver, which then updates the VF configuration in the physical adapter.

In FIG. 3, adapter driver data is collected as indicated in a block 306. The VF device drivers are locked out utilizing an enhanced error handling (EEH) functionality of the processing and logic provided by the hypervisor 130; and I/O processor host bridge debug data is collected as indicated in a block 308. Next adapter debug data in the adapter at the time of failure is collected; this includes the register set, as indicated in a block 310. Next, an adapter dump is triggered or generated if one is not already present on the adapter, as indicated in a block 312. The adapter dump is collected or retrieved from the adapter as indicated in a block 314. This possibly may require resets and reinitialization of the adapter, depending on the implementation of the adapter vendor. This adapter dump includes the information on both the adapter and the VFs.

The debug data collected by the adapter driver is sent to the HMC as indicated in a block 316. Next, as indicated in a block 318 the adapter is reinitialized, again, this reprises functionality of enhanced error handling (EEH), and the adapter reinitialization includes an indication to the VF driver as to whether or not error data should be collected. As indicated in a block 320, the VFs are unlocked, allowing the VF device drivers to commence recovery of the VF.

Referring now to FIG. 4, as indicated in a block 400, the VF device becomes locked, provided at step or block 308 in FIG. 3. Then the VF device driver detects an error responsive to the VF device being locked, and commences an error recovery process or procedures as indicated in a block 402. As indicated in a block 404, the VF device driver polls the device state until the VF device is unlocked, which is provided at step or block 330 in FIG. 3.

As indicated in a block 406, the VF driver collects error data, if so indicated by the adapter driver, and logs the collected date appropriately. VF driver goes through normal reinitialization, and as part of reinitialization, it determines whether error data is to be collected with this indication provided at block 318 in FIG. 3 and is communicated from the adapter driver to the VF drivers. For example, this is accomplished via a VF driver query from the adapter itself of what the type of the last reset done to the adapter was. If the last reset was a firmware reset then error data is collected. The firmware reset is the indication that some other system component encountered an error that required the VF device driver to also collect its error data. The VF driver reads the EEH error data from the hypervisor. This includes a Log ID to allow correlation between the VF error data collected by each of the VF drivers, and also the error data collected by the adapter driver. The VF device driver completes recovery and resumes normal I/O operations as indicated in a block 408.

Figure 5:
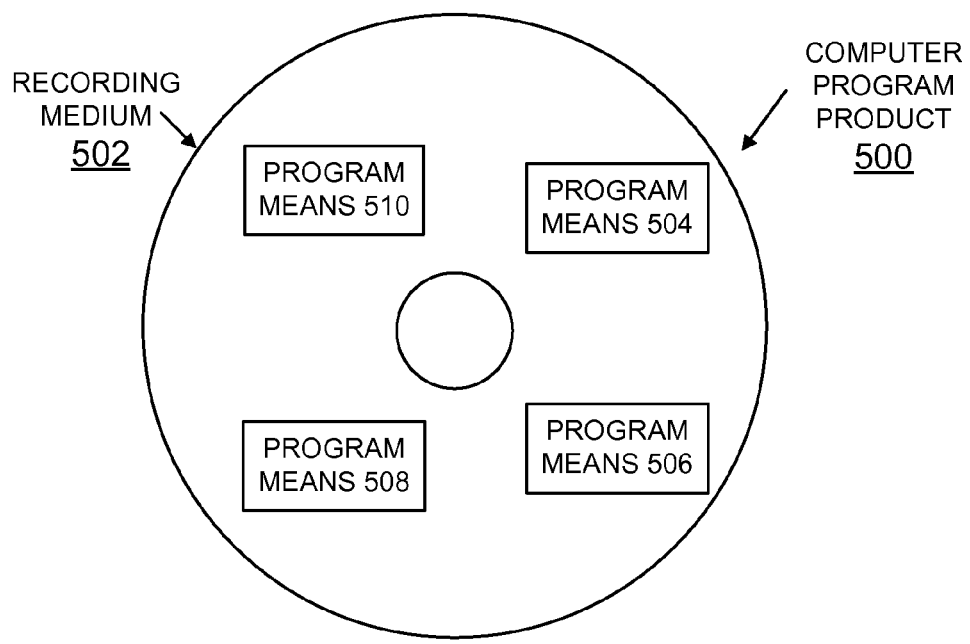
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. Recording medium 502 stores program means 504, 506, 508, and 510 on the medium 502 for carrying out the methods for implementing distributed debug data collection and analysis for an I/O adapter, such as a Single Root Input/Output Virtualization (SRIOV) adapter of a preferred embodiment in the system 100 of FIG. 1, or system 200 of FIG. 2.

A sequence of program instructions or a logical assembly of one or more interrelated modules defined by the recorded program means 505, 506, 508, and 510, direct the computer system 500 for implementing distributed debug data collection and analysis for an I/O adapter, such as a Single Root Input/Output Virtualization (SRIOV) adapter of a preferred embodiment.

While the present invention has been described with reference to the details of the embodiments of the invention shown in the drawing, these details are not intended to limit the scope of the invention as claimed in the appended claims.

What is claimed is:

1. A method for implementing distributed debug data collection and analysis for an input/output (I/O) adapter in a computer system comprising:
   triggering a base error collection sequence responsive to a predetermined triggering event;
   collecting adapter driver data and locking virtual function (VF) device drivers responsive to triggering the base error collection sequence;
   collecting adapter debug data and reinitializing the adapter including providing an indication to said VF device drivers if VF error data is to be collected; and
   unlocking the virtual function (VF) device drivers, allowing the VF device drivers to commence recovery of a respective virtual function (VF), wherein said predetermined triggering event includes a VF device driver initiating an adapter dump on the adapter, and wherein the method includes restricting the VF device driver from collecting the adapter dump.

2. The method as recited in claim 1, wherein the adapter includes a Single Root Input/Output Virtualization (SRIOV) adapter.

3. The method as recited in claim 1, wherein the base error collection sequence includes collecting the adapter dump responsive to locking out said virtual function (VF) device drivers, the adapter dump including information on virtual functions (VFs).

4. The method as recited in claim 1, wherein locking out said virtual function (VF) device drivers includes utilizing an error handling recovery function, and further includes collecting I/O host bridge debug data responsive to locking out said virtual function (VF) device drivers.

5. The method as recited in claim 1, wherein the VF device driver detects an error responsive to the virtual function (VF) device drivers being locked, and commences an error handling recovery process; and further includes said VF device driver polling device state until the VF device driver is unlocked.

6. The method as recited in claim 1, including said VF device driver collecting error data responsive to said indication provided to said VF device driver of said VF error data to be collected.

7. The method as recited in claim 1, wherein said predetermined triggering event includes an adapter driver provided with a system hypervisor receiving a request from a hardware management console (H MC).

8. The method as recited in claim 1, wherein said predetermined triggering event includes an adapter driver provided with a system hypervisor detecting an internal adapter driver error.

9. The method as recited in claim 1, wherein said predetermined triggering event includes an adapter driver provided with a system hypervisor detecting an adapter dump present on the adapter.

10. The method as recited in claim 9, wherein said predetermined triggering event includes an adapter driver provided with a system hypervisor detecting one or more of an adapter error or a platform error.

11. A system for implementing distributed debug data collection and analysis for a hardware I/O adapter in a computer system comprising: a processor;
   a hypervisor managing functions associated with the hardware I/O adapter;
   said processor using said hypervisor to perform the steps of:
   triggering a base error collection sequence responsive to a predetermined triggering event;
   collecting adapter driver data and locking virtual function (VF) device drivers responsive to triggering the base error collection sequence;
   collecting adapter debug data and reinitializing the adapter including providing an indication to said VF device drivers if VF error data is to be collected; and unlocking the virtual function (VF) device drivers, allowing the VF device drivers to commence recovery of a respective virtual function (VF), wherein said predetermined triggering event includes a VF device driver initiating an adapter dump on the adapter, and wherein the method includes restricting the VF device driver from collecting the adapter dump.

12. A method for implementing distributed debug data collection and analysis for an input/output (I/O) adapter in a computer system comprising:
    triggering a base error collection sequence responsive to a predetermined triggering event;
    collecting adapter driver data and locking virtual function (VF) device drivers responsive to triggering the base error collection sequence;
    collecting adapter debug data and reinitializing the adapter including providing an indication to said VF device drivers if VF error data is to be collected; and
    unlocking the virtual function (VF) device drivers, allowing the VF device drivers to commence recovery of a respective virtual function (VF), wherein said predetermined triggering event includes a VF device driver initiating an adapter dump on the adapter, and wherein the VF device driver initiating an adapter dump is conditional on a privilege being granted to the VF device driver.

13. The method as recited in claim 12, wherein the adapter includes a Single Root Input/Output Virtualization (SRIOV) adapter.

14. The method as recited in claim 12, wherein the base error collection sequence includes collecting an adapter dump responsive to locking out said virtual function (VF) device drivers.

15. The method as recited in claim 12, wherein said predetermined triggering event includes an adapter driver provided with a system hypervisor receiving a request from a hardware management console (HMC).

16. The method as recited in claim 12, wherein said predetermined triggering event includes an adapter driver provided with a system hypervisor detecting an internal adapter driver error.

17. The method as recited in claim 12, wherein said predetermined triggering event includes an adapter driver provided with a system hypervisor detecting an adapter dump present on the adapter.

18. The method as recited in claim 12, wherein said predetermined triggering event includes an adapter driver provided with a system hypervisor detecting one or more of an internal adapter driver error, a platform error, an adapter error, or an adapter dump present on the adapter.

19. The method of claim 12, wherein the VF device driver initiating an adapter dump is conditional on a privilege being granted to the VF device driver by a system administrator.

20. The method of claim 12, wherein the method includes collecting I/O processor host bridge debug data.

* * * * *